United States Patent

[11] 3,621,239

[72] Inventor Martin J. Cohen
West Palm Beach, Fla.
[21] Appl. No. 794,741
[22] Filed Jan. 28, 1969
[45] Patented Nov. 16, 1971
[73] Assignee Franklin GNO Corporation
West Palm Beach, Fla.

[54] DETECTING A TRACE SUBSTANCE IN A SAMPLE GAS COMPRISING REACTING THE SAMPLE WITH DIFFERENT SPECIES OF REACTANT IONS
4 Claims, 4 Drawing Figs.
[52] U.S. Cl............................................. 250/41.9 TF,
250/41.9 G, 250/41.9 SB
[51] Int. Cl..................................................... B01d 59/44,
H01j 39/34
[50] Field of Search......................................... 250/41.91,
41.9 SB

[56] References Cited
UNITED STATES PATENTS
| | | | |
|---|---|---|---|
| 3,211,996 | 10/1965 | Fox................................ | 250/41.9 TF |
| 2,810,075 | 10/1957 | Hall et al........................ | 250/41.91 |
| 2,950,387 | 8/1960 | Brubaker......................... | 250/41.91 |
| 3,254,209 | 5/1966 | Fite et al......................... | 250/41.9 |

Primary Examiner—James W. Lawrence
Assistant Examiner—C. E. Church
Attorney—Raphael Semmes ABSTRACT: Methods for sorting and detecting trace gases which undergo ion-molecule reactions. Particular species of reactant ions are selected by choice of reagent gas and/or by reactant ion filtering to produce predictable product ions by reaction with trace gas molecules of a sample. The sample may be reacted with different species of reactant ions and the results compared to confirm the presence of particular species of product ions. The reagents producing different species of reactant ions may have ionization potentials above and below the ionization potential of the expected trace gas molecules.

PATENTED NOV 16 1971          3,621,239

INVENTOR
MARTIN J. COHEN

BY *Raphael Semmes*

ATTORNEY

DETECTING A TRACE SUBSTANCE IN A SAMPLE GAS COMPRISING REACTING THE SAMPLE WITH DIFFERENT SPECIES OF REACTANT IONS

BACKGROUND OF THE INVENTION

This invention relates to methods of ion classification and more particularly is concerned with the utilization of predetermined reactant on species in measurements performed upon trace gases which undergo ion-molecule reactions.

The copending application of Martin J. Cohen, David I. Carroll, Roger F. Wernlund, and Wallace D. Kilpatrick Ser. No. 777,964, filed Oct. 23, 1968 and entitled "Apparatus and Methods for Separating, Concentrating, Detecting, and Measuring Trace Gases," discloses "Plasma Chromatography" systems involving the formation of primary or reactant ions and reaction of the primary ions with molecules of trace substances to form secondary or product ions, which may be concentrated, separated, detected, and measured by virtue of the difference of the velocity or mobility of the ions in an electric field. The primary ions may be produced by subjecting the molecules of a suitable host gas, such as air, to ionizing radiation, for example. The primary ions are then subjected to an electric drift field, causing them to migrate in a predetermined direction through a reaction space into which the sample or trace gas is introduced. The resultant collisions between primary ions and the trace gas molecules produce secondary ions of the trace gas in much greater numbers than can be produced by mere electron attachment, for example, to the trace gas molecules. The secondary ions are also subjected to the electric drift field and may be sorted in accordance with their velocity or mobility. The pressure within the Plasma Chromatograph drift cell is maintained high enough (preferably atmospheric) to ensure that the length of the mean free path of the ions in the cell is very much smaller than the dimensions of the cell. A specific system of the copending application employs a pair of successively arranged ion shutter grids or gates for segregating the ion species in accordance with their drift time. The opening of the first gate is timed to pass a group of ions, which may comprise unreacted primary ions as well as secondary ions, and the opening of the second gate is timed to pass a portion of the group to an ion detection means. A two-gate drift cell has only a single velocity analysis region. The copending application of David I. Carroll, entitled "Apparatus and Methods for Separating, Detecting, and Measuring Trace Gases," filed Jan. 8, 1969, discloses a four-gate drift cell, which may include a pair of velocity analysis regions, one for sorting primary ions prior to the desired ion-molecule reactions, and a second for sorting secondary ions produced by ion-molecule reactions between the primary ions and the molecules of a substance to be detected.

BRIEF DESCRIPTION OF THE INVENTION

The present invention is concerned with methods of ion separation and detection utilizing apparatus of the type set forth in the foregoing copending applications for example, and employing particular species of reactant ions for producing predictable reactions with the molecules of substances to be detected.

It is accordingly a principal object of the present invention to provide improved methods for separating and detecting trace gases and for confirming the presence of particular trace gases in gaseous samples.

Briefly stated, preferred embodiments of the methods of the present invention are concerned with "Plasma Chromatography" systems which involve the formation of positive or negative ions by reactions between the molecules of trace substances and primary ions. By employing particular reagent gases and/or by filtering the reactant or primary ions, predictable reactions are produced between the reactant ions and expected trace substances in a gaseous sample. The secondary ions produced by such reactions are separated and detected in a drift cell by utilizing the difference in velocity or drift time of ions of different mass in an electric field. The secondary ions produced and detected depend upon the relative ionization potentials of the reagent gas molecules and the trace gas molecules, and reagent gases having different ionization potentials, which may bracket the ionization potential of the trace gas, may be employed in multiple ion-molecule reactions with the trace gas, and the results of the multiple reactions may be compared.

BRIEF DESCRIPTION OF THE DRAWING

The invention will be further described in conjunction with the accompanying drawing, which illustrates typical apparatus which may be employed in the methods of the invention, and wherein.

DETAILED DESCRIPTION OF THE INVENTION

Figure 1:
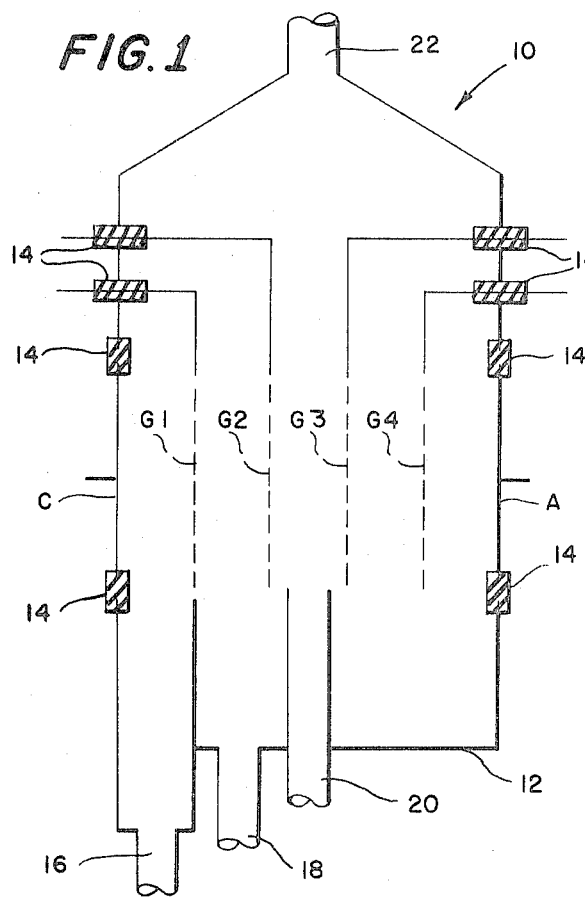
FIG. 1 is a diagrammatic longitudinal section view illustrating a four-gate drift cell of the type disclosed in the aforesaid copending Carroll application.

Before proceeding with a description of the methods of the invention typical apparatus for carrying out the invention will be described. Referring to the drawing, and initially to FIG. 1, a Plasma Chromatography cell 10 may comprise an envelope 12 enclosing a series of electrodes, which may be of parallel plane geometry, for example. Principal electrodes C and A may be arranged adjacent to opposite ends of the envelope, or may actually constitute opposite end walls of the envelope, as shown, being supported by suitable insulators 14 if the envelope walls are conductive. When the apparatus is used to detect negative ions, electrode C will be a cathode and electrode A an anode. When the apparatus is used to detect positive ions, the polarities will be reversed. The Plasma Chromatography cell described in the said copending Carroll application includes four shutter grids or ion gates, such as grids G1, G2, G3, and G4. Such shutter grids per se and their operation are well known in the drift cell art. Each of the shutter grids comprises two sets of interdigitated parallel wires, alternate wires of each grid being connected together to form the two sets. Electrode C, or the region of the envelope near this electrode, is provided with an ionizing source, such as a tritium foil forming a part of the electrode C. Electrode A may be a collector plate constituting an output electrode.

Grids G1, G2, G3 and G4 are arranged in spaced sequence between the electrodes C and A and define therewith sequential regions within the envelope 12. The electrodes may be spaced apart distances of the order of a few centimeters or less, and the total cathode-to-anode spacing may be of the order of 10 centimeters. Inlet tubes 16, 18 and 20 permit the introduction of gas into selected regions of the envelope. Tube 16 permits the introduction of gas into the region between C and G1. Tube 18 permits the introduction of gas into the regions between G1 and G2, between G3 and G4, and between G4 and A, while tube 20 permits the introduction of gas between G2 and G3. A single outlet tube 22 may be provided at the opposite end of the envelope for exhausting gas therefrom. The outlet end of the envelope may be tapered to facilitate streamlined flow of the 401 gases transverse to the direction between electrodes C and A. By maintaining the gas flow transverse to this direction and by controlling the relative rates of gas flow, it is possible to maintain the desired gaseous media in the various regions. It will be noted that inlet tubes 16 and 20 extend farther into the envelope 12 than inlet tube 18, so as to place the effluents from tubes 16 and 20 directly into the spaces C–G1 and G2–G3. Electrode A may be connected to an electrometer (not shown), such as a carry Instruments Model 401 (vibrating reed-type) with current sensitivity of $10^{15}$ amperes at a time constant of 300 milliseconds.

An electric drift field is provided between the principal electrodes C and A. As described in the copending Carroll application, the source of the drift field may be a chain of batteries connected between electrode C and ground. If negative ions are to be detected, for example, the negative end of the battery chain will be connected to cathode C and the positive end to ground. Anode A may be connected to ground through the input circuit of the electrometer. Alternatively, a resistor chain voltage divider may be employed in conjunction with a battery connected across the chain.

Adjacent elements of each shutter grid are normally maintained at equal and opposite potentials relative to a grid average potential established by the battery chain. Under these conditions, the shutter grid is closed to the passage of electrically charged particles. At predetermined times, all of the elements of a grid are driven to the same potential, the grid average potential, by the use of suitable grid drive circuits. The grid drive circuits open the ion gates in sequence, the G1 drive circuit producing sync pulses and the G2, G3 and G4 drive circuits producing pulses successively delayed relative to the G1 pulses. A series of guard rings, spaced along the envelope between electrodes C and A, may be provided and connected to the voltage divider chain to maintain the uniformity of the drift field.

In accordance with the invention, a selected reagent gas may be inserted into the region C—G1 from inlet 16, and the sample gas inserted into the region G2–G3 from inlet 20. Primary ions of the reagent gas are produced by the ionizing means at electrode C and drift toward electrode A, the drift field polarity being appropriately chosen in accordance with the primary ions to be produced. At an appropriate moment, grid G1 is opened to permit a particular species of primary ions to enter the space G1–G2. If an inert drift gas is inserted into this region through inlet 18, as described in the copending application of David I. Carroll, Martin J. Cohen and Roger F. Wernlund, entitled "Apparatus and Methods for Separating, Detecting, and Measuring Trace Gases with Enhanced Resolution," X Ser. No. 780,851, filed Dec. 3, 1968, there will be no ion-molecule reactions within the region G1–G2, and the primary ions passed by grid G1 will merely become spacially separated in accordance with their velocity in the drift field. If grid G2 is opened at a predetermined time delayed with respect to the opening of grid G1, a particular species of primary ions will be passed to the region G2–G3. A sample including trace gas to be detected is inserted into the region G2–G3 by inlet 20. In drifting through this region, the primary ions encounter sample gas molecules. Although a majority of these collisions may be with nonreactive molecules, a small fraction of the collisions will be with the reactive trace gas molecules of interest. In these cases the primary ions will interact with the trace gas molecules to form secondary ions, which will have, in general, an appreciable difference in mobility from the primary ions.

The ion flux at grid G3 will consist of unreacted primary ions and possibly several species of secondary ions. A sample of this mixed population is periodically admitted to the drift region between G3 and G4 when a pulse is momentarily applied to grid G3 from its grid drive circuit at a predetermined instant delayed with respect to the application of the pulse to grid G2 from its grid drive circuit. The ions that pass through grid G3 enter the secondary ion velocity analysis region between grid G3 and G4, which, as indicated above, may also be provided with an inert gas from inlet 18, so as to quench any ion-molecule reactions within this region. The ions which enter the region G3–G4 become grouped in accordance with their velocity in the drift field.

At a predetermined time delayed with respect to the opening of grid G3, a pulse is momentarily applied to grid G4, so that a particular species of ions is passed to the detection region between G4 and A. The resultant output current in the anode circuit, due to ions impinging upon anode A, is integrated over several cycles to give a measurable current. By scanning the time of opening the grid G4 relative to grid G3, a drift time spectrum of the ion population in he region G3–G4 can be obtained in the output and recorded to produce an output curve (current v. drift time) with peaks representing different ion species. This permits various secondary ion species to be separated and identified. Similarly, by scanning the time of opening of grid G2 relative to grid G1, particular species of primary ions may be passed to the ion-molecule reaction region between G2 and G3. It is thus apparent that by selecting a particular reagent gas and by selecting the time of opening of grid G2 relative to grid G1, it is possible to select particular species of primary ions for reaction with particular species of trace gas molecules to produce predictable output current peaks.

Figure 4:
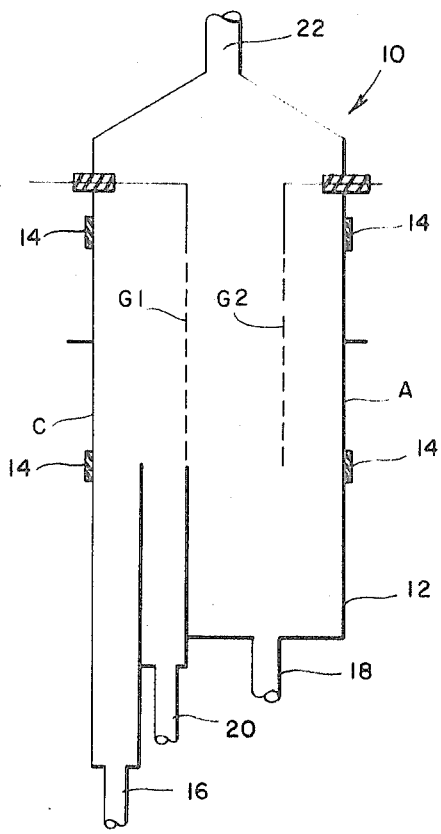
FIG. 4 is a diagrammatic longitudinal section view of a two-gate drift cell of the type disclosed in the aforesaid copending Cohen et al. application.
Figure 2:
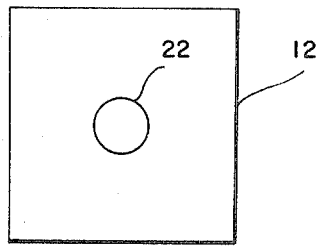
FIGS. 2 and 3 are views of the opposite ends of the cell of FIG. 1.
Figure 3:
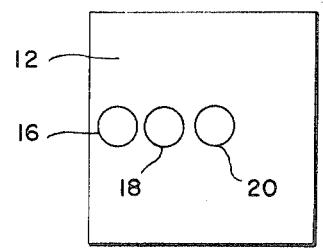

In the simpler form of apparatus shown in FIG. 4, only two ion gates or shutter grids, G1 and G2, are employed. In this instance, both the reagent gas and the sample gas are inserted into the region C–G1 by inlet 16 and inlet 20, respectively. Regions G1–G2 and G2–A are supplied with nonreactive drift gas by inlet 18. The apparatus of FIG. 4 lacks the capacity of the apparatus of FIG. 1 to sort primary ions before reaction with trace gas molecules, but by the use of particular reagent gases with particular samples, predictable ion-molecule reactions in the region C–G1 will be produced. The primary ions will be formed from the reagent gas adjacent to electrode C and will drift toward electrode A, colliding with sample gas molecules and producing secondary ions. The mixed population of primary and secondary ions will be sampled by grid G1, this grid being opened at an appropriate time, and the ions passed to the region G1–G2 will be separated in accordance with their velocity. At appropriate times, grid G2 is opened to pass particular ion species to the detection region G2–A.

The methods of the present invention are predicated upon the basic principle of selecting a species of reactant ions of known reactivity with particular trace materials in order to produce product ions in an unambiguous manner. Highly exothermic ion-molecule reactions have large forward reaction rates between the ion and molecule reacting. The exothermic behavior can be predicted on the basis of differences in ionization potential or other molecular energy values. The principles of the invention will be described, for example, with respect to the separation and detection of fluorocarbons but may be applied to the separation and detection of all substances having a finite vapor pressure and which undergo ion-molecule reactions.

The ability of primary ions to produce secondary ions depends upon the relative ionization potentials of the reagent gas and the trace gas. In close ion-molecule interactions, the electron will transfer from the material of lower ionization potential to the material of higher ionization potential, as this is the exothermic reaction direction to yield a lower stable state. It is thus possible to establish an ionization potential series for the prediction of ion-molecule reactions. The following table of halocarbons displays a sequence of ionization potential thresholds from about 10 to about 18 volts for positive ions, the list being in sequence from low to high ionization potential:

TABLE I

| Name | Formula X | Ionization Potential |
| --- | --- | --- |
| Difluoro dichloro ethylene | $C_2F_2Cl_2$ | 10.0 |
| Difluoro dibromo methane | $CF_2B_{r2}$ | 11.1 |
| Carbon Tetrachloride | $CCl_4$ | 11.5 |
| Freon 11 | $CFCl_3$ | 11.77 |
| Freon 113 | $CF_3CCl_3$ | 11.78 |
| Genetron 101 | $CH_3CF_2Cl$ | 12.0 |
| Difluoro bromo methane | $CHC_2F_2$ | 12.1 |
| Freon 12 | $CF_2Cl_2$ | 12.3 |
| Freon 22 | $CHClF_2$ | 12.45 |
| Freon 13 | $CClF_3$ | 12.9 |
| Carbon Tetrafluoride | $CF_4$ | 17.8 |

The following is a table of lower molecular weight gases arranged in accordance with increasing ionization potential for positive ions, the gases being separated by intervals of roughly 0.5 volts:

TABLE II

| Name | Formula | Ionization Potential |
| --- | --- | --- |
| $NO_2$ | | 10.0 |
| Ethylene | $C_2H_4$ | 10.5 |
| Acetylene | $C_2H_2$ | 11.4 |
| Oxygen | $O_2$ | 12.2 |
| Ozone | $O_3$ | 12.8 |
| Sulfur dioxide | $SO_2$ | 13.4 |
| Carbon dioxide | $CO_2$ | 13.8 |

Similar ionization spectrums for positive and negative ions may be established for many different types of substances.

Referring to tables I and II, it will be seen that the positive ion of ethylene in table II, with an ionization potential of 10.5 volts, will ionize only the neutral molecule difluoro dichloro ethylene in table I, which has a lower ionization potential of 10 volts, and not the halocarbons of higher ionization potential. The necessary ethylene ion can be made by using the special reagent gas ethylene. Thus, if a mixture of halocarbons, as from a gas chromatograph is applied to a drift cell (e.g., Fig. 1 or Fig. 4) as a sample, the presence of difluoro dichloro ethylene in the mixture may be confirmed by reacting the sample with primary ions produced form the reagent gas ethylene and noting whether a peak on the output curve corresponding to difluoro dichloro ethylene is produced. It is assumed, of course, that it is known that the mixture does not include other materials of ionization potential less than 10.5 or that the locations of the peaks of such materials on the output curve is known from past experience.

MOre generally, by using a pair of reactant ion species, such as $O_2^+$ at 12.2 volts and $O_3^+$ at 12.8 volts, the presence of trace gas molecules with ionization potential lying between 12.2 and 12.8 can be determined. $O_2^+$ ionizes everything below 12.2. Thus, if different peaks appear in the output curve when $O_3^+$ is the reactant ion, rather than $O_2^+$, then there must be molecules with ionization potential between 12.2 and 12.8. From the tables, it is apparent that carbon tetrachloride and freon 12 could be separated and identified in this manner.

Reactions with multiple reactant ion species may occur sequentially or concurrently. For example, different reagent gases may be applied to a drift cell sequentially and the results noted in the output, or they may be applied to a pair of drift cells concurrently, each of which receives the sample gas, and the different reactions may be noted on the output curves and compared.

Halocarbon gases may be used as reagents to look for other halocarbons. Low molecular weight fluorocarbons may be used in looking for high molecular weigh unknowns in order to maximize difference in velocity in the drift field (and vice versa).

The invention claimed embodiments have been shown and described it will be apparent that modifications can be made without departing from the principles of the invention.

The invention claim is:

1. A method of detecting a particular substance in a gaseous sample, which comprises reacting molecules of said sample with at least two different predetermined species of reactant ions having known reactivity with said substance to produce secondary ions while subjecting said ions to a drift field, the molecules of said reactant ion species having different ionization potentials respectively above and below the ionization potential of the substance to be detected, separating the ions in accordance with their velocity, detecting secondary ions produced by the reactions, and thereupon comparing the results obtained in the detecting in response to each reactant ion species, said reacting and separating steps being performed at regions maintained at sufficient gas pressure to ensure that the length of the mean free path of the ions at said regions is very much smaller than the dimensions of said regions.

2. A method of detecting a particular substance in a gaseous sample, which comprises reacting molecules of the sample with a first predetermined species of reactant ions, subjecting any resultant ions and remaining reactant ions to a drift field, separating the resultant ions in accordance with their velocity in the drift field, and detecting at least some of the resultant ions, reacting molecules of said sample with a second predetermined species of reactant ions, subjecting any resultant ions from the last-mentioned reaction and remaining reactant ions of the second species to a drift field, separating the last-mentioned resultant ions in accordance with their velocity in the drift field, detecting at least some of the last-mentioned resultant ions, and comparing the results obtained in the detecting steps, the molecules of said reactant ion species having different ionization potentials respectively above and below the ionization potential of the substance to be detected, the reacting, subjecting, and separating steps being performed at regions maintained at sufficient gas pressure to ensure that the length of the mean free path of the ions at said regions is very much smaller than the dimensions of said regions.

3. A method in accordance with claim 2 wherein the reacting steps are carried out concurrently, the separating steps are carried out concurrently, and the detecting steps are carried out concurrently.

4. A method in accordance with claim 2, wherein the detecting steps are carried out sequentially.

* * * * *